(12) United States Patent
Hidinger et al.

(10) Patent No.: US 10,649,609 B2
(45) Date of Patent: May 12, 2020

(54) UNIVERSAL NOTIFICATION PIPELINE

(71) Applicant: Microsoft Technology Licensing, LLC, Redmond, WA (US)

(72) Inventors: Matt Hidinger, Seattle, WA (US); Lei Xu, Kirkland, WA (US); Andrew Tyler Bares, Bellevue, WA (US); Thomas Fennel, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 506 days.

(21) Appl. No.: 15/183,779

(22) Filed: Jun. 15, 2016

(65) Prior Publication Data

US 2017/0285882 A1    Oct. 5, 2017

Related U.S. Application Data

(60) Provisional application No. 62/316,526, filed on Mar. 31, 2016.

(51) Int. Cl.
| | | |
|---|---|---|
| *G06F 3/0481* | (2013.01) | |
| *G06F 9/54* | (2006.01) | |
| *H04L 12/58* | (2006.01) | |

(52) U.S. Cl.
CPC ............ *G06F 3/0481* (2013.01); *G06F 9/542* (2013.01); *H04L 51/24* (2013.01)

(58) Field of Classification Search
CPC ........... H04L 51/24; G06F 3/0481; G06F 9/54
See application file for complete search history.

(56) References Cited

U.S. PATENT DOCUMENTS

| | | | |
|---|---|---|---|
| 8,463,858 B2 | 6/2013 | Bouazizi | |
| 9,118,614 B1 | 8/2015 | Rogers et al. | |
| 2003/0169749 A1* | 9/2003 | Huang | H04L 45/00 370/401 |
| 2003/0208549 A1* | 11/2003 | El-Shimi | G06F 9/542 709/207 |
| 2007/0078935 A1* | 4/2007 | Garcia-Martin | H04L 51/04 709/206 |
| 2008/0039008 A1* | 2/2008 | Chen | H04L 12/1895 455/3.01 |

(Continued)

OTHER PUBLICATIONS

"International Search Report and Written Opinion Issued in PCT Application No. PCT/US2017/024402", dated Jul. 7, 2017, 14 Pages.

(Continued)

*Primary Examiner* — Tuan C Dao

(57) ABSTRACT

Inventive embodiments described herein relate to a universal approach for handling user interface notifications. A notification pipeline on a device acts as an intermediary between applications on the device and notification surfaces on the device. Notification surfaces register themselves with the notification pipeline to become active subscribers. Applications or other processes submit notifications complying with a same format, schema, structure, etc. to the notification pipeline. The notification pipeline broadcasts the notification to the subscribed notification surfaces, which in turn determine whether or how to handle and perhaps display the notification based on the content of the notification.

25 Claims, 10 Drawing Sheets

(56) References Cited

U.S. PATENT DOCUMENTS

| | | | | |
|---|---|---|---|---|
| 2008/0080677 | A1* | 4/2008 | Samdadiya | H04L 51/04 379/67.1 |
| 2008/0126455 | A1* | 5/2008 | Francfort | H04L 63/08 708/200 |
| 2010/0037248 | A1* | 2/2010 | Lo | H04N 7/17327 725/1 |
| 2010/0325201 | A1 | 12/2010 | Chitturi et al. | |
| 2012/0102168 | A1 | 4/2012 | Mercuri | |
| 2012/0233272 | A1 | 9/2012 | Bedi et al. | |
| 2013/0013804 | A1 | 1/2013 | Traynor | |
| 2013/0066980 | A1 | 3/2013 | Vasters | |
| 2013/0217416 | A1* | 8/2013 | Matthews, III | H04W 4/025 455/456.2 |
| 2013/0311291 | A1* | 11/2013 | Ward | G06Q 30/0264 705/14.58 |
| 2014/0032707 | A1 | 1/2014 | Doshi | |
| 2014/0164514 | A1* | 6/2014 | Eteminan | H04L 29/06176 709/204 |
| 2014/0229862 | A1* | 8/2014 | St. Clair | H04L 51/32 715/753 |
| 2017/0099329 | A1* | 4/2017 | Karneges | H04L 67/42 |

OTHER PUBLICATIONS

"Versioned notification API", Retrieved on: Mar. 17, 2016 Available at: https://specs.openstack.org/openstack/nova-specs/specs/mitaka/approved/versioned-notification-api.html.

"Sending and Scheduling Push Notifications", Retrieved on: Mar. 17, 2016 Available at: http://docs.appcelerator.com/platform/latest/#!/guide/Sending_and_Scheduling_Push_Notifications.

Sadun, Erica, "The iPhone Developer's Cookbook: Push Notifications", Published on: Jan. 4, 2009 Available at: http://www.informit.com/articles/article.aspx?p=1433733&seqNum=5.

Xu, Ray, "Quickstart: Sending a local toast notification and handling activations from it (Windows 10)", Published on: Jul. 8, 2015 Available at: https://blogs.msdn.microsoft.com/tiles_and_toasts/2015/07/08/quickstart-sending-a-local-toast-notification-and-handling-activations-from-it-windows-10/.

Jamil, Tahseen, "Microsoft Launches Notifications Visualizer for Windows 10", Published on: Nov. 3, 2015 Available at: http://www.c-sharpcorner.com/news/microsoft-launches-notifications-visualizer-for-windows-10.

"Using Oracle Mobile Cloud Service", Retrieved on: Mar. 17, 2016 Available at: https://docs.oracle.com/cloud/latest/mobilecs_gs/MCSUA/GUID-C39695F6-9012-4A63-ADDF-47F04BF0AC73.htm#MCSUA-GUID-C39695F6-9012-4A63-ADDF-47F04BF0AC73.

"2.2.3.5 Notify Payload (Payload Type 0x0B) Packet", Retrieved on: Mar. 17, 2016 Available at: https://msdn.microsoft.com/en-us/library/cc223903.aspx.

Hale, David, "Windows Push Notification Services (WNS) overview", Retrieved on: Mar. 17, 2016 Available at: https://msdn.microsoft.com/en-us/windows/uwp/controls-and-patterns/tiles-and-notifications-windows-push-notification-services-wns-overview.

Hale, David, "Adaptive and interactive toast notifications", Retrieved on: Mar. 17, 2016 Available at: https://msdn.microsoft.com/en-us/windows/uwp/controls-and-patterns/tiles-and-notifications-adaptive-interactive-toasts.

"APNs Provider API", Published on: Mar. 3, 2016 Available at: https://developer.apple.com/library/ios/documentation/NetworkingInternet/Conceptual/RemoteNotificationsPG/Chapters/APNsProviderAPI.html.

Liu, Qianting, "The Usage of Microsoft Push Notification Service on Mobile Devices", In Thesis for the Degree of Master of Science in Technology, May 12, 2011, 70 pages.

Damaggio, Elio, "Delivering push notifications to millions of devices with Windows Azure Notification Hubs", Published on: Sep. 16, 2013 Available at: https://blogs.windows.com/buildingapps/2013/09/16/delivering-push-notifications-to-millions-of-devices-with-windows-azure-notification-hubs/.

"Registering, Scheduling, and Handling User Notifications", Published on: Dec. 21, 2015 Available at: https://developer.apple.com/library/ios/documentation/NetworkingInternet/Conceptual/RemoteNotificationsPG/Chapters/IPhoneOSClientImp.html.

* cited by examiner

UNIVERSAL NOTIFICATION PIPELINE

RELATED APPLICATIONS

This application is related to U.S. Provisional Application No. 62/316,526, titled "UNIVERSAL NOTIFICATION PIPELINE", filed Mar. 31, 2016, and incorporated herein by reference.

BACKGROUND

A goal of computing is to provide information to people. Assuming that a person uses a computing device to access information, competing factors can bear on how and when information should be presented. For example, a user's goals may vary according to how much time is available, what activity the user is engaged in, the importance of available information, etc. The amount and type of information that is available and the frequency at which it becomes available can vary significantly. Moreover, computing devices that display information have a wide range of power capabilities, computing capacity, display size, and types of input devices. A given piece of information could potentially be destined for a small device worn on a wrist and a device with a large display in a building lobby.

To accommodate the variety and complexity of information presentation factors, software developers have designed different types of notification mechanisms or notification surfaces. For example, many operating systems or graphical user shells provide different notification surfaces for different contexts. For instance, a lock screen or login screen might have a notification surface, a "home" or "start" screen for launching applications might have icons capable of displaying notifications or information about them, a tool or status bar might have a user interface element that can be activated to display notifications, or a "toast" notification surface might be provided. In any case, these kinds of notification surfaces often have different sizes, consume different types or formats of information, implement different semantics, and are interfaced through different application programming interface (API) or protocols.

The inventors alone have realized that it is becoming difficult for developers to write software that can take advantage of the variety of notification surfaces available on different platforms. The inventors have appreciated that a developer writing software to disseminate a single item of information might currently need to write many sections of code, each customized for respective notification surfaces. In addition, if a single item of notification information is intended to be displayed by multiple notification surfaces of a same device, multiple notification messages of varying content and format might need to be transmitted, resulting in duplicative transmission of the same item of information, possibly resulting in multiple process "wake ups" and other overhead at the receiving device. Consequently, the inventors alone have realized that providing a universal notification mechanism on a computing device can potentially ease some of the problems related to the proliferation of notification surfaces.

SUMMARY

The following summary is included only to introduce some concepts discussed in the Detailed Description below. This summary is not comprehensive and is not intended to delineate the scope of the claimed subject matter, which is set forth by the claims presented at the end.

Inventive embodiments described herein relate to a universal approach for handling user interface notifications. A notification pipeline on a device acts as an intermediary between applications on the device and notification surfaces on the device. Notification surfaces may register themselves with the notification pipeline to become active subscribers to the pipeline. Applications or other processes submit to the notification pipeline notifications complying with a same format, schema, structure, etc. The notification pipeline broadcasts the notification to the subscribed notification surfaces, which in turn determine whether or how to handle and perhaps display information in the notification based on the content of the notification.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to a universal notification pipeline. Notification surfaces in general will be described first, including some graphical attributes, their technical features, and how they have been implemented. A notification pipeline is described next. A publisher-subscriber design is explained, as well as techniques to integrate the notification pipeline into existing notification surfaces or managers.

Figure 1:
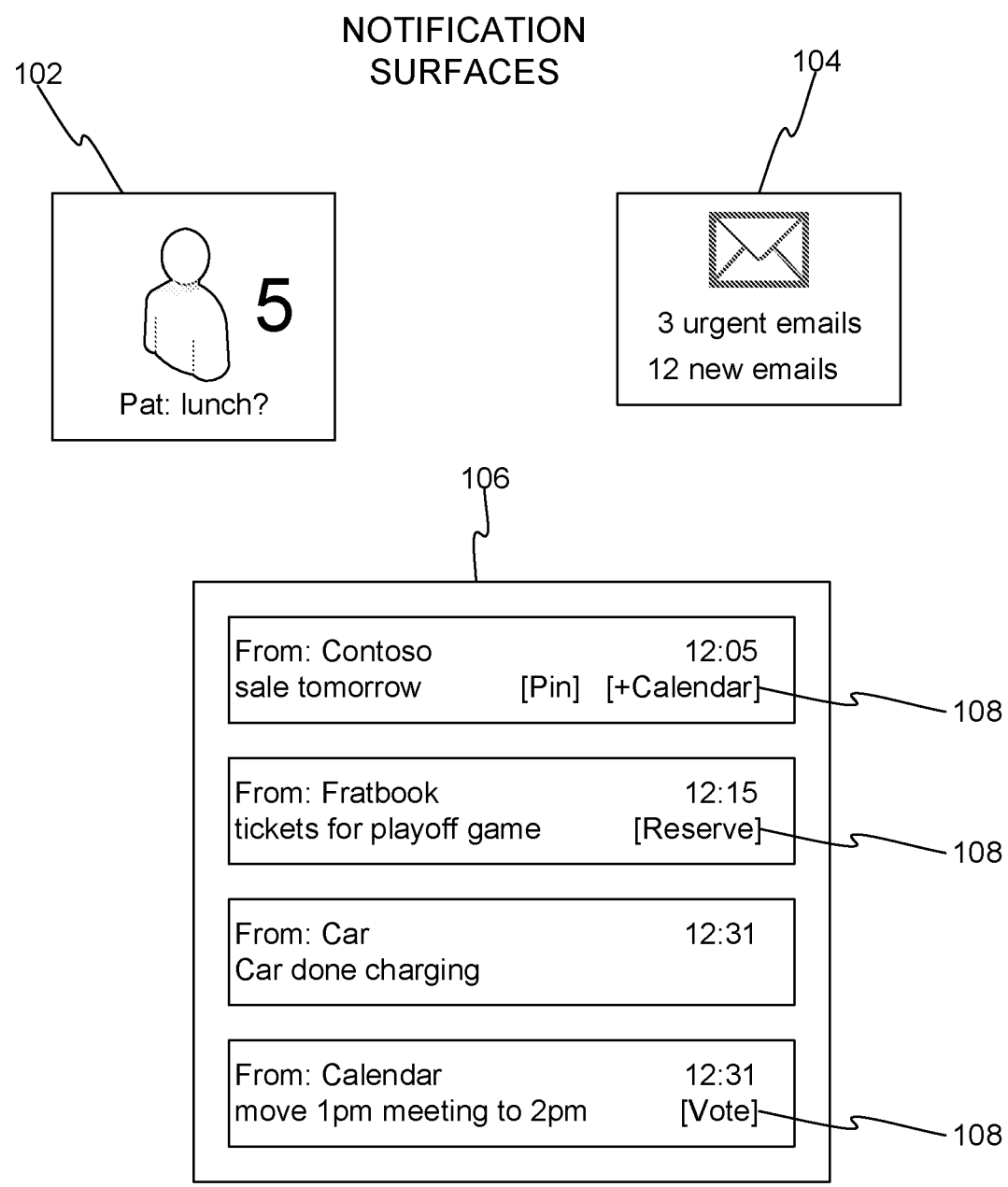
FIG. 1 shows examples of notification surface graphics.

FIG. 1 shows examples of notification surface graphics that might be displayed by a same computing device. As discussed in the Background, a variety of notification surfaces are known and in use. Embodiments described herein can be conveniently used by existing and new notification surfaces. The term "notification surface" as used herein refers to pieces of executable software on a computing device and the graphical user interface (GUI) elements that they generate and control. Generally, most notification surfaces have been accessible, through respective unique APIs or the like, to any software or application executing on the relevant computing device. Most notification surfaces have distinct behavior and appearance. As shown in FIG. 1, notification surfaces are often incorporated in graphical user shells in the form of dynamic icons 102, information panels 104 as might appear in a "desktop" or side bar of a graphical shell, a toast widget 106, etc. Some notification surfaces, as part of a graphical user shell, are able to "pop up" or overlay other graphics. Some notifications may be incorporated into a login or lock screen. Some notification surfaces may have interactive GUI elements 108 for dismissing notifications, opening related content or applications, and so forth. Some notification surfaces may only display information non-interactively. Some notification surfaces are autonomous operating system processes, whereas some are integrated into an operating system.

Figure 2:
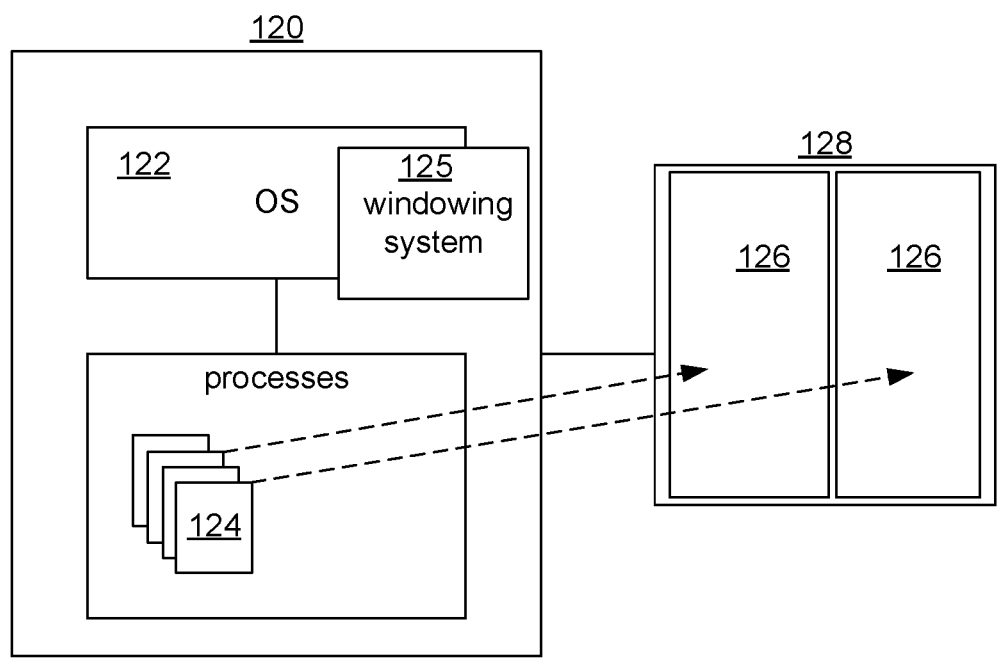
FIG. 2 shows a computing device and software environment within which notification surfaces may execute.

FIG. 2 shows a computing device 120 and software environment within which notification surfaces may execute. The computing device 120 has an operating system 122 managing processes 124 including a windowing system 125 that, for some of the processes (e.g., applications) manages the display of windows 126 displayed on a display 128. The computing device 120 may be any of a variety of types which are described later with reference to FIG. 10. The computing device 120 has at least storage hardware and processor hardware for executing the operating system 122 and the processes 124. The windowing system 125 may be any type of windowing system, for instance tiled, "free form", single window (only one application window is displayed at a time), etc. Processes are well known operating system objects that are discretely managed units of execution, typically having a process identifier, memory managed by the operating system 122 (heap and/or stack memory), and may be managed in a process table of process identifiers or the like that is maintained by the operating system 122.

Figure 3:
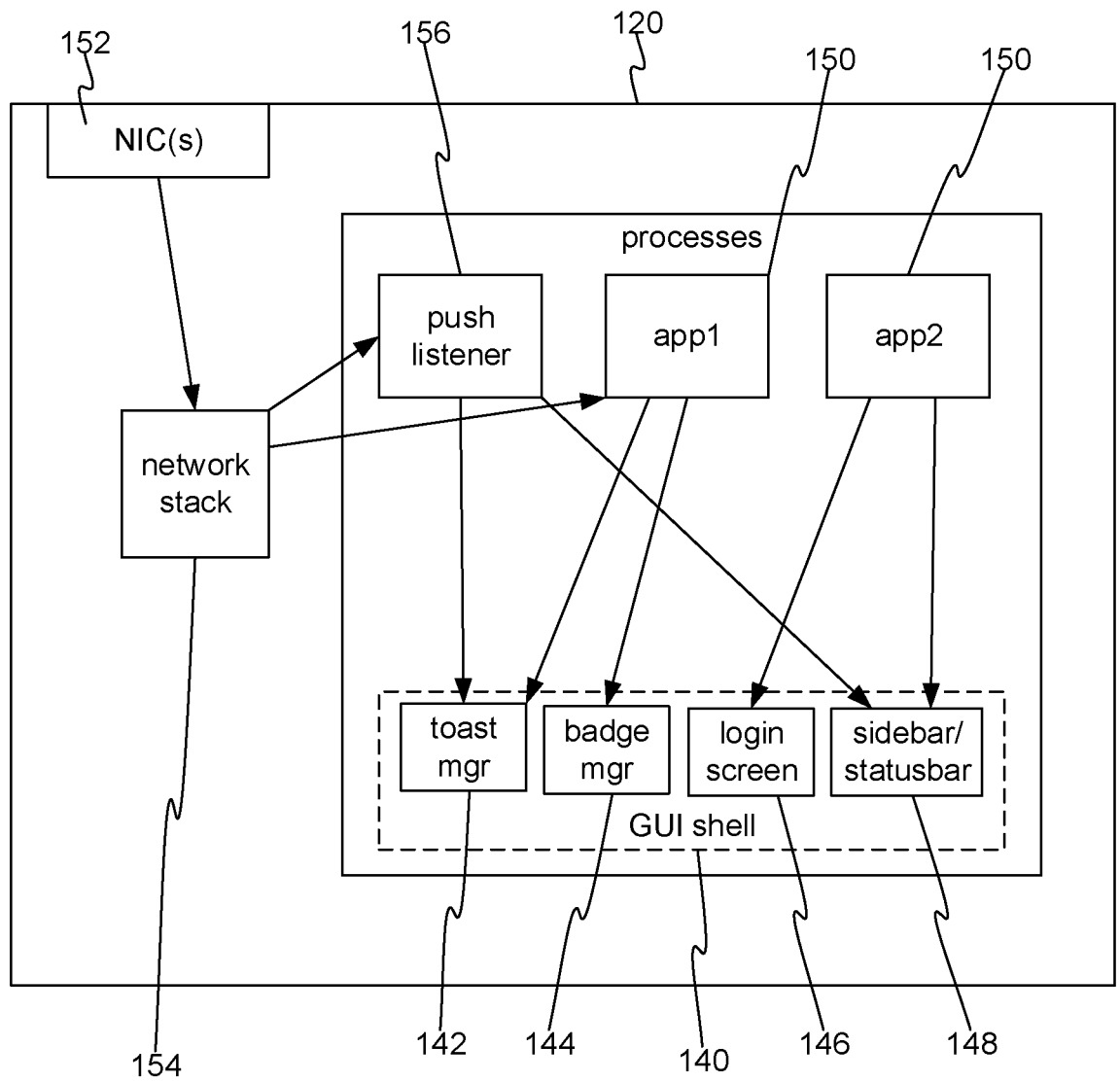
FIG. 3 shows an example of a computing device with disparate notification surfaces.

FIG. 3 shows an example of a computing device with disparate notification surfaces. As noted, it is common for a GUI shell 140 or environment to include different types of notification surfaces. The notification surfaces may execute as respective processes. For instance, a toast manager 142, badge manager 144, login screen 146, and statusbar 148 (or sidebar, toolbar, etc.) may be respective processes or distinction components/interfaces of a same process. Some GUI shells also include a tile manager (not shown) that manages the appearance, display, layout, and user-activations of dynamic tiles or icons, which function as both application-launching icons as well as mini-windows that can display notifications for represented applications.

Local software elements, typically applications 150, execute on the computing device 120 and submit notifications to whichever notification surfaces they are programmed to interface with. To accommodate remote notifications received from a network via a network interface card 152 and network stack 154, a push listener 156 background process may receive and handle network notifications, for instance in the form of HyperText Transfer Protocol (HTTP) messages. As can be seen in FIG. 3, the each notification client has had to communicate directly with whichever notification surfaces it intends to use.

Figure 4:
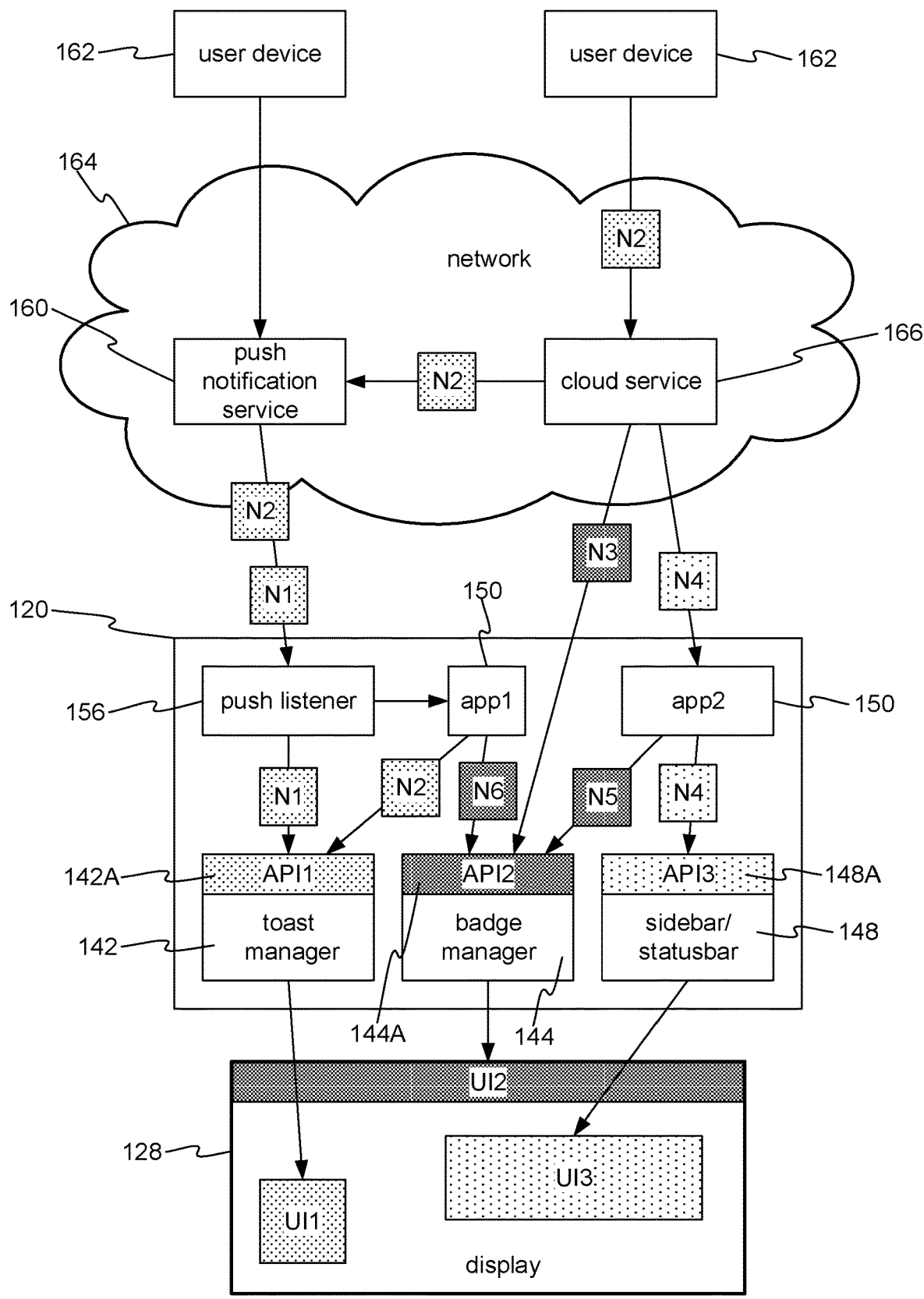
FIG. 4 shows details of an example scenario of uncoordinated use of notification surfaces.

FIG. 4 shows details of an example scenario of uncoordinated use of notification surfaces. Each of the depicted notification surfaces have their own APIs 142A, 144A, 148A. The shades of the notifications in FIG. 4 correspond to the shades of their respective APIs 142A, 144A, 148A. A push notification service 160 might receive a message from a user device 162 (e.g., a smartphone), which push the notification service 160 uses to build a notification N1 that is pushed via a network 164, for instance as an HTTP message containing an application-identifying unique Uniform Resource Identifier (URI), to the push listener 156. The push notification service 160 also receives a notification N2 relayed by a cloud service 166 from another user device 162.

The notification N2 is received by the push listener 156, which passes N2 to application 150 (app1), which might translate N2 into a corresponding data structure or object that is passed via API 142A (API1) to the toast manager 142A. The cloud service 166 also originates its own notifications N3 and N4. Notification N3 is transmitted directly to a custom network listener of the badge manager 144, and notification N4 is transmitted to application 152 (app2) which, possibly after reformatting or repackaging the N4 notification, invokes the corresponding API 148A (API3) to submit the notification to the statusbar 148. The application 150 (app2) also originates a notification N5 for the API 144A (API2) of the badge manager 144. Similarly, application 150 (app1) originates notification N6 that is submitted to the badge manager 144. The relevant notification surfaces receive and handle their notifications in known ways, which will usually involves rendering a notification graphic to inform a person using the computing device 120.

As can be seen in FIG. 4, each client requires different code for each notification surface it intends to use. Even if a common format or schema is used by all of the notification surfaces for encapsulating notification content, different APIs are involved and separate communications are needed for each notification surface that is to receive a same piece of notification content or information. In addition, in the case of stateful notifications, if a client intends to use different notification surfaces to give notices of a same piece of information, if the state of one notification changes, ideally, the client must detect the notification change and communicate with the other notification surfaces to inform them of the status change.

Figure 5:
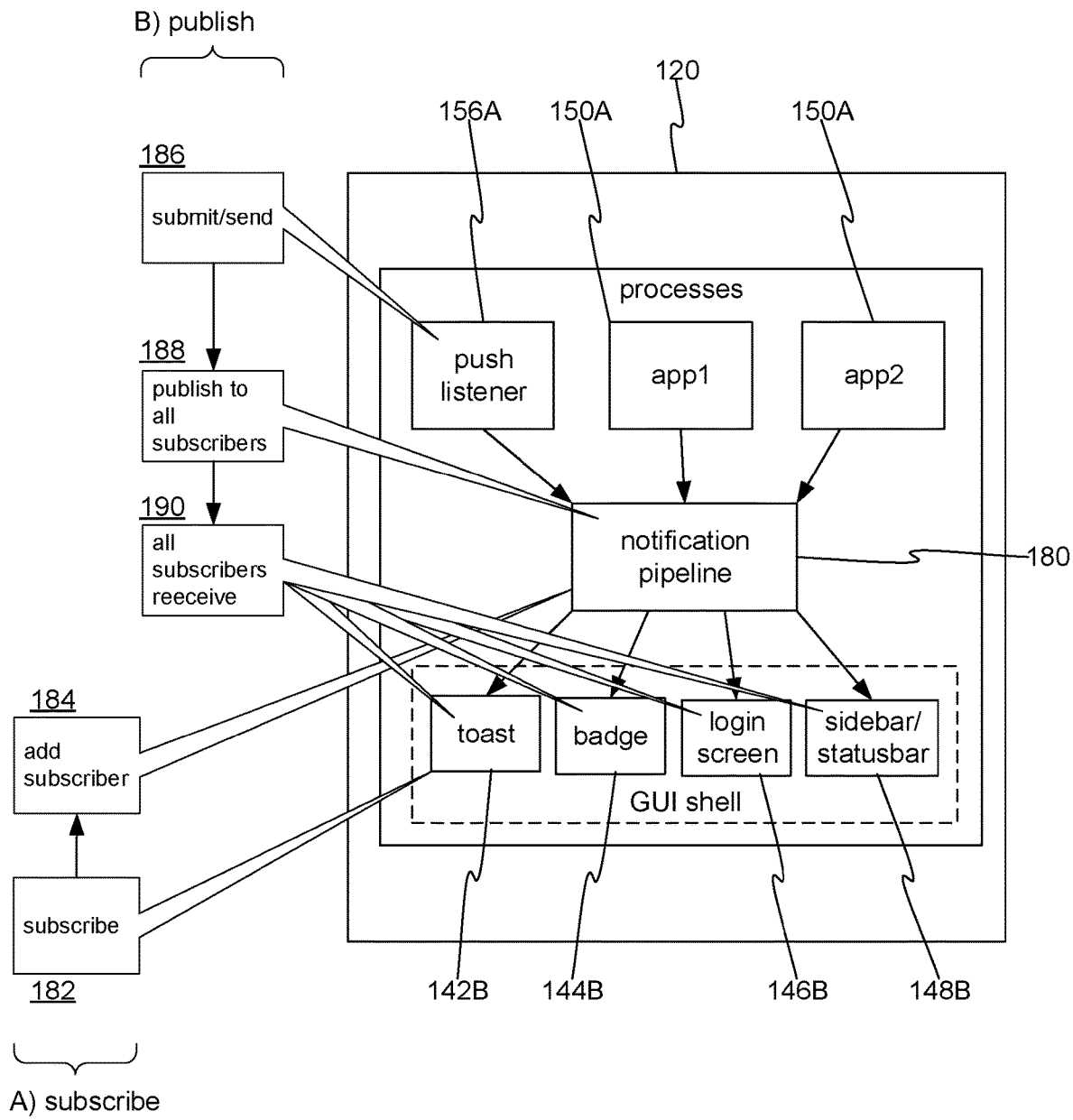
FIG. 5 shows an embodiment of a notification pipeline.

FIG. 5 shows an embodiment of a notification pipeline 180. Depending on how it is implemented, the notification pipeline 180 may obviate some of the shortcomings of dealing with multiple notification surfaces without significant modification of existing notification surfaces or systems. The notification pipeline 180 implements a publish-subscribe ("pub-sub") design pattern. Notification surfaces and clients thereof use the notification pipeline 180 to intermediate exchanges of notifications. As shown in FIG. 5, the clients such as push listener 156A and applications 150A differ from their counterparts discussed earlier. The notification surfaces 142B, 144B, 146B, and 148B also differ from their preceding siblings. Both the clients and the notification surfaces are modified in several ways.

First, clients and notification surfaces should be built or modified to use a common notification format. An aspect of the pub-sub design of the notification pipeline 180 is that each notification received from a client by the notification pipeline 180 is passed to each notification surface that is currently subscribed to the notification pipeline 180. Any client or notification surface that participates should implement a same notification format or data structure. For example, if notification payloads are implemented as eXtensible Mark-up Language (XML) code, then each notification should conform to a same XML schema. In that case, clients should be programmed to format their notifications as XML code conformant to a notification schema. Examples are described in the application referenced above in the "RELATED APPLICATIONS" section. Other types of data packaging or formatting may be used for notifications. For instance, well-defined data structures (e.g., JavaScript Object Notation), portable objects, sets of key-value pairs in text form, etc. Of note will be a "contract" or understanding that any subscribed notification surface will be able to at least parse and interpret (possibly using other facilities) a notification that complies with the agreed-upon data format.

How a notification surface handles the content of a compliant notification, if at all, is up to the notification surface. Although, semantic conventions may be attached to features of notifications.

Second, the clients and notification surfaces should be coded to use a same API or other type of software interface to access the notification pipeline 180. A notification pipeline API can be as simple as a "subscribe( )" call, a "publish( )" call, and possibly an "unsubscribe( )" call, although other calls or methods may be helpful, as discussed later. As described in detail below, notification surfaces call "subscribe( )" or an equivalent to become subscribers and consequently receive notifications. Clients call "publish( )" to pass a notification as a parameter, event, or the like.

The left side of FIG. 5 shows subscribing steps. At step 182 the subscribe( ) function is invoked, and the notification pipeline 180 responds at step 184 by adding the caller to a list of current subscribed notification surfaces (see the subscription list 204 in FIG. 6). The left side of FIG. 5 also shows publishing steps. At step 186 a client such as push listener 156A calls the subscribe( ) function to submit a standardized notification (one conforming to the "contract"). In response, at step 188, the notification pipeline 180 publishes the notification to all of the current notification surfaces that have registered with the subscribe( ) call. At step 190, the subscribers receive the notification.

Figure 6:
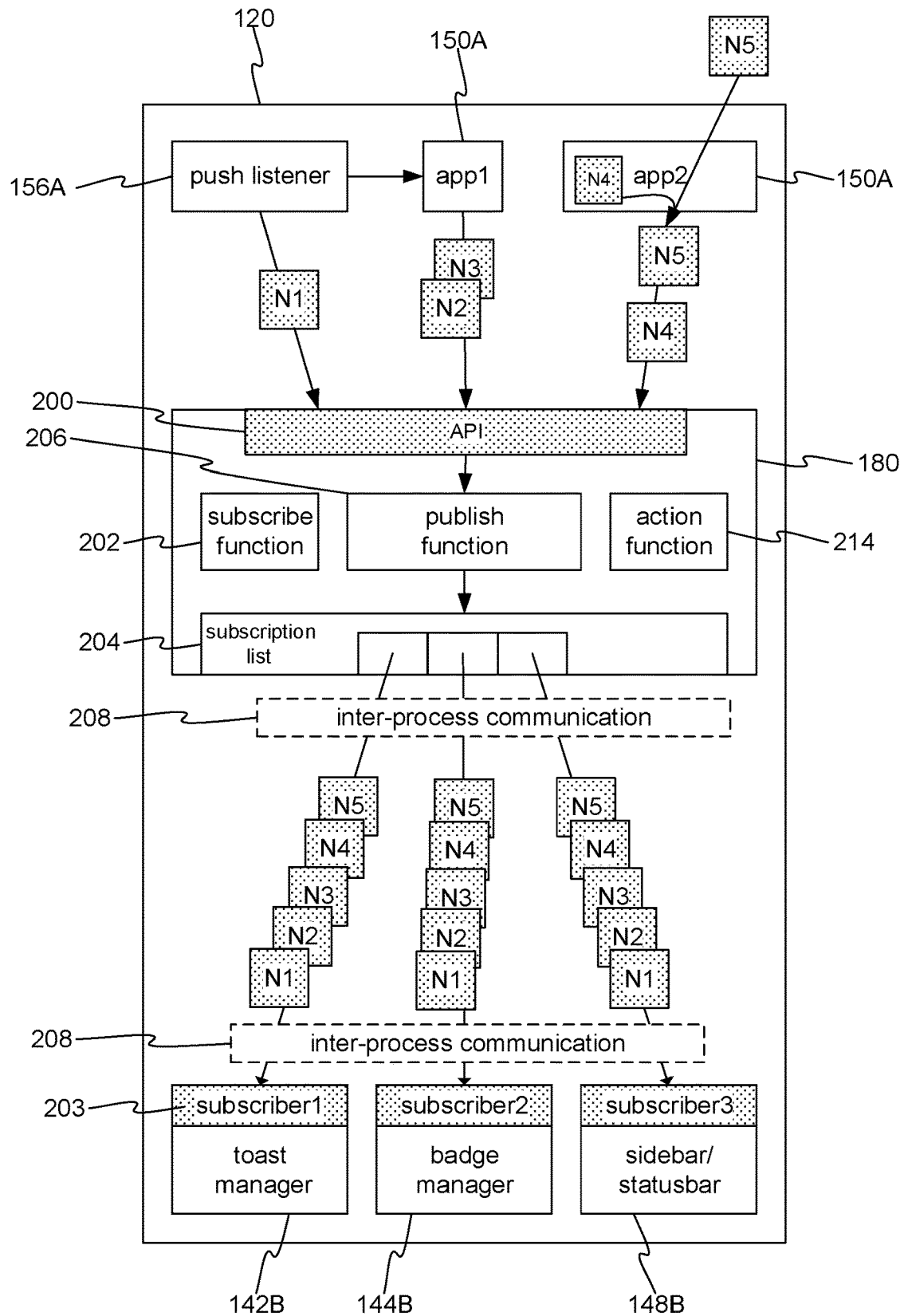
FIG. 6 shows another embodiment of the notification pipeline.

FIG. 6 shows an embodiment of the notification pipeline 180. The same shading of notifications N1-N5 and the API 200 reflect the use of a common notification scheme or format and the same API 200 (or other type of software interface) by the clients and notification surfaces. In FIG. 6, it is assumed that each of the exemplary notification surfaces have already invoked the subscribe function 202 through the API 200 and that the notification pipeline 180 has added respective identifiers 203 to a subscription list 204. When the push listener 156A is to issue a notification N1, the push listener 156A invokes the publish function 206. In response, the publish function 206 is executed for notification N1. The publish function obtains the identifiers from the subscription list 204 and passes the notification N1 to each of the identified notification surfaces. Consequently, with one API call and one notification message or payload, the push listener 156A, for instance, is able to provide same notification content to multiple notification surfaces. Similarly, notifications N2-N5 are published. Each time, one notification transaction from a publishing client results in a broadcast of a notification.

In one embodiment, an inter-process communication (IPC) mechanism 208 may be used to pass notifications from the notification pipeline 180 to the subscribed notification surfaces. For instance, an event routing/sinking mechanism of the operating system may be used, where each notification surface listens for a notification-type event and implements an event handler for the same. Other IPC mechanisms may be used, for instance shared memory, message queues, pipes, etc. Although overhead and performance might be prohibitive, the notification pipeline can also be implemented as an application-level protocol built on top of the local network protocol stack. Notifications could be formed as HTTP requests, for instance. Internally generated notifications would only pass through a loopback interface and notifications from a network would be directly handled by the pipeline (a push listener, for instance, might be obviated). An IPC approach will likely be preferable.

Regarding the assumption that various notification surfaces have already subscribed, it is convenient for a notification surface to invoke the subscribe function 202 in its initialization code. A typical notification surface will begin executing at boot time, login, etc. Some notification surfaces may take advantage of the unsubscribe function 210 (see FIG. 7) to reduce computation overhead, reduce power consumption, or accommodate some application-specific logic.

Figure 7:
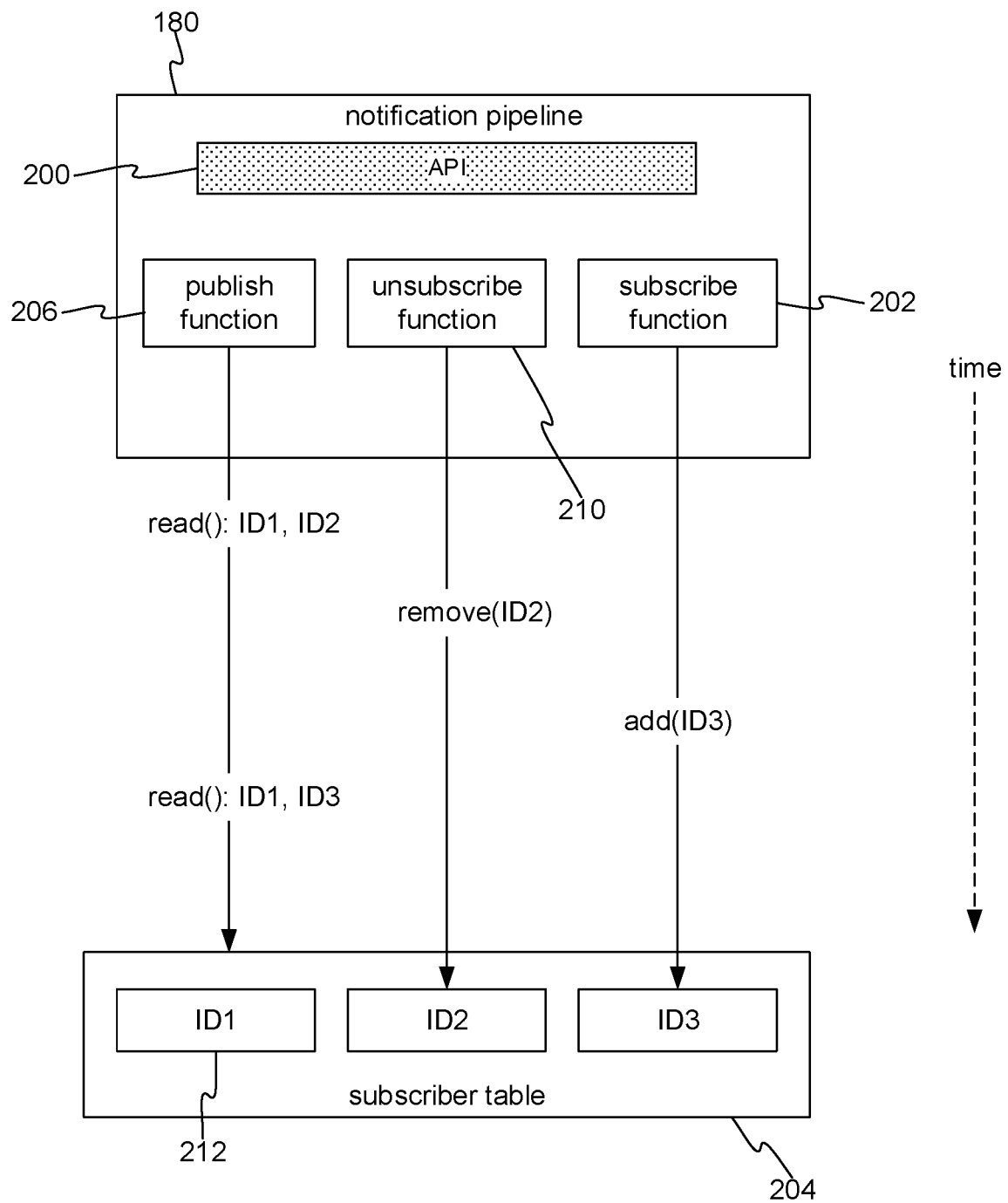
FIG. 7 shows an example of how a notification subscription list can change over time.

FIG. 7 shows an example of how the subscription list 204 can change over time. First, to handle a notification publication request, the publish function 206 reads the subscriber table or list 204 and finds subscriber identifiers 212 ID1 and ID2, to which the notification request is sent. Next, a notification surface invokes the unsubscribe function 210 to remove itself from the subscriber list 204. Although ID2 is shown as a parameter, in practice, a notification surface might not need to explicitly identify itself; the notification pipeline 180 accesses the invoker's execution context or the like to identify the subscribing or unsubscribing surface. Next, a third notification surface invokes the subscribe function 202 which in turn adds its identifier (ID3) to the subscriber list 204. Responsive to a second invocation of the publish function 206 to publish another notification, the subscriber list 204 is again read and the current subscriber identifiers 212—ID1 and ID3—are used to send the second notification.

FIG. 6 also shows an action function 214. The action function 214 can be any type of action that can be directed to notifications. For example, the action function 214 can be a "dismiss( )" function invocable by any notification surface, client, or other software. The dismiss function corresponds to a dismissal of a notification. If a notification surface invokes the dismiss function, the call might reflect a user interaction with the corresponding surface to dismiss a notification. The notification pipeline 180 identifies the surface that called the dismiss function, and publishes a dismiss message or event to the other subscribed notification surfaces. Each notification surface that receives the dismissal message may respond by dismissing the identified notification. Other types of actions or control logic may be provided to coordinate actions of the notification surfaces, thus reducing the notification-related logic needed by individual applications (clients).

The notification pipeline 180 may also implement gatekeeper functionality. For instance, the notification pipeline 180 can check each incoming notification for conformance with the standard schema or format, which can alleviate the notification surfaces from each having to perform the same function.

Figure 8:
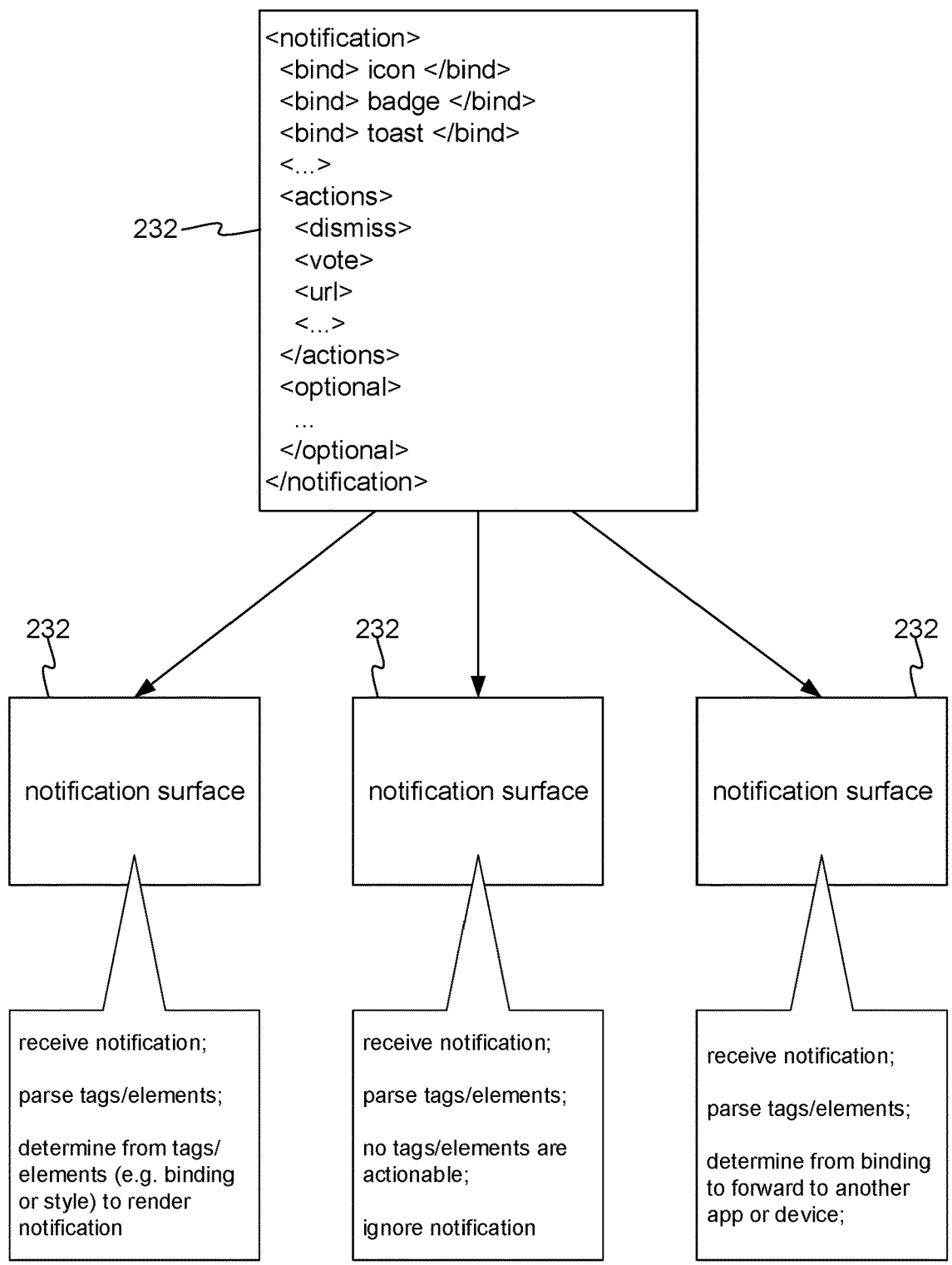
FIG. 8 shows how different notification surfaces might each handle a same notification.

FIG. 8 shows how different notification surfaces 230 might each handle a same notification 232. The notification surface 230 depicted on the left might receive the notification 232, parse out the elements, and evaluate which elements are present and what their attributes and inner values are. From that information, the logic of the notification surface determines to render the notification 232. The notification surface 230 depicted in the center similarly receives and parses the same notification 232. However, the logic for this surface determines that the notification should be ignored. The notification surface 230 depicted on the right decided that the notification 232 is applicable, but rather than render the notification 232, the notification surface forwards the notification 232, for example, to an agent or proxy of another device (e.g., a wearable device).

Figure 9:
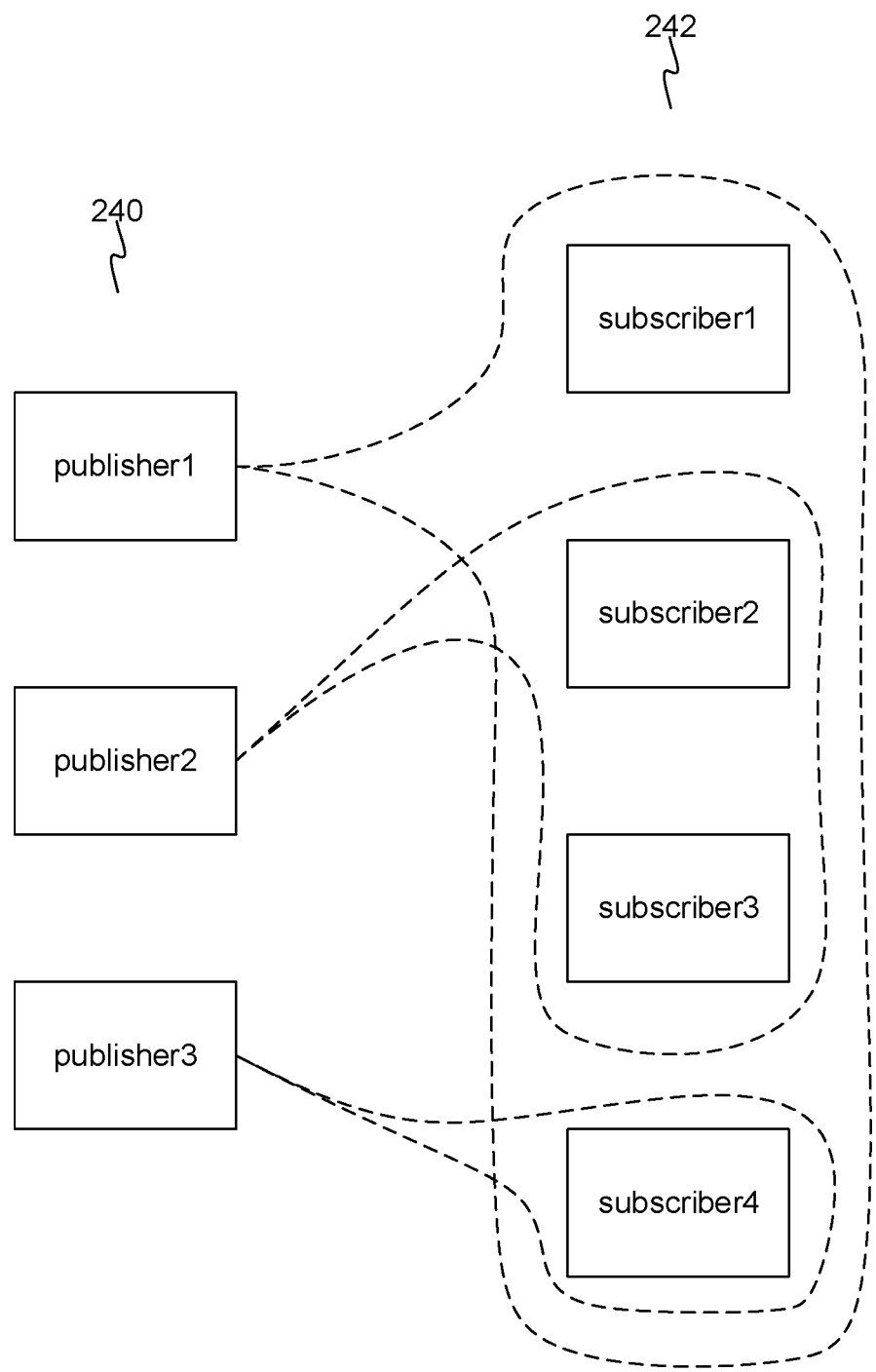
FIG. 9 conceptually shows how the notification pipeline enables different notification publishers to specify categorical notification intentions to subscribers.

FIG. 9 conceptually shows how the notification pipeline enables different notification publishers 240 to specify categorical notification intentions to subscribers 242. As noted in the BACKGROUND section, many variables can affect notification choices. When an application is coded and compiled, it is unlikely that a developer will know exactly what kinds of devices the application will run on, which notification surfaces will be available or what their characteristics such as size and capabilities might be. If a universal notification schema is used, as in the above-referenced related patent application, a notification publisher 240 can define bindings for which a notification should be applied.

For instance, a notification might be defined as being bound to "medium" sized notification surfaces or notification surfaces greater than a certain size. Different style hints or notification content might be associated with different bindings. Put another way, a notification publisher need not specify particular notification surfaces, but rather specifies the types or properties for which a notification is intended, all subscribed notification surfaces receive the notification, and each subscriber 242 handles the notification according to its own traits compare to the specifications of the notification. In FIG. 9, if publisher1 has published a notification with few if any requirements, then each subscriber acts on the notification. If publisher2 publishes a notification that specifies a large notification surface, and only subscriber2 and subscriber3 meet the requirement, then they display the notification and the other subscribers ignore it. If publisher3 submits to the pipeline a notification that includes text with a specification that the text is only to be rendered as audio, and if only subscriber4 has such a capability, then only subscriber4 supplies the information to the user; the other subscribers take no action. By the same logic, publishers can specify intentions for how different portions of content or semantics of a notification are to be handled.

The notification pipeline can also help avoid forward and backward compatibility issues. Further to that purpose, the standard format or schema can include an "optional" construct or tag. Each surface is guaranteed to be able to at least recognize and parse the optional tag. Older surfaces might ignore such optional notification content, but newer surfaces might be programmed to act upon the optional content. As new notification surface features arise, newer clients will be able to plug into them without affecting backward compatibility of the older clients. For example, if a software developer wants to support video in a toast, and perhaps a first version of a graphical shell does not support video toast but a second version does, if the notifying client puts the video content in the optional part of the notification, then the same notification payload can be sent without regard for whether the first or second version will be handling it.

In some cases, a notification surface might need to know which application on its computing device submitted a notification. As noted above, the notification pipeline can automatically identify which application has submitted a notification and provide that information with the broadcasted publication of the notification. This allows the application-specific recipient to direct the content of the notification to the appropriate sub-surface or object. For instance, if a badge style notification is published with the identity of the application that published it, a recipient can update the icon of the corresponding application. In other words, the notification pipeline can be designed to enable implicit association of applications and notifications. Two different processes with multiple notification surfaces, all or many of which are associated with particular respective applications, can, through one subscription, receive notifications from the respective applications and direct them to the appropriate application-specific notification surfaces.

Figure 10:
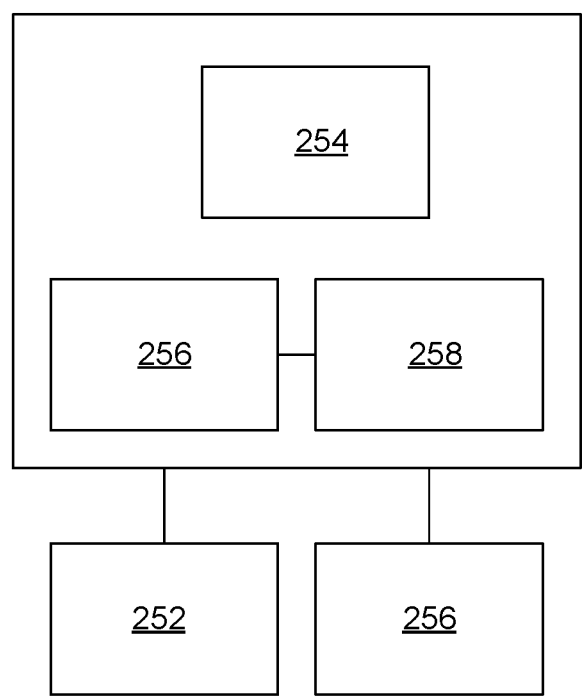
FIG. 10 shows an example of a computing device.

FIG. 10 shows details of a computing device 120 on which embodiments described above may be implemented. The technical disclosures herein constitute sufficient information for programmers to write software, and/or configure reconfigurable processing hardware (e.g., FPGAs), and/or design application-specific integrated circuits (ASICs), etc., to run on one or more of the computing devices 120 to implement any of features or embodiments described in the technical disclosures herein.

The computing device 120 may have a display 252, a network interface 254, as well as storage hardware 256 and processing hardware 258, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 256 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 250 may cooperate in ways well understood in the art of computing. In addition, input devices may be integrated with or in communication with the computing device 250. The computing device 250 may have any form factor or may be used in any type of encompassing device. The computing device 250 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least storage hardware such as optical storage (e.g., compact-disk read-only memory (CD-ROM)), magnetic storage hardware, flash read-only memory (ROM), and the like. The information stored in storage hardware can be in the form of machine executable instructions (e.g., compiled executable binary code), source code, bytecode, or any other physical hardware having a physical state that can transfer information to processing hardware to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computing device comprised of processing hardware, storage hardware, and a display, the method comprising:

executing, by the processing hardware, an operating system, the operating system managing execution, by the processing hardware, of processes, the processes comprising publisher processes, subscriber processes, and a notification process, the publisher processes including a listener process;

executing the notification process, the notification process implementing a plurality of functions including at least a first function and a second function, the plurality of functions accessible to the publisher and subscriber processes via an application programming interface (API);

maintaining a set of subscriber identifiers respectively identifying subscriber processes that are subscribed to the notification process;

receiving, by the notification process via the API, from publisher processes, notifications provided by the publisher processes, each notification comprising a respective notification content payload, each notification content payload structured to conform to a same format or schema, the notifications including notifications received via a network, from a notification service, by the listener process; and each time a notification is received by the notification process, responding by the notification process passing the corresponding received notification content payload to, according to the set of subscriber identifiers, whichever subscriber processes are subscribed to the notification process, wherein each subscriber process receives each notification content payload received by the notification process, wherein the subscriber processes include (i) a lockscreen process that when active displays notifications received thereby and (ii) a graphical user shell process comprised of application icons that displays the application icons with indicia of notifications received by the graphical user shell process, wherein the lockscreen process and the graphical user shell process receive a same notification content payload based on being subscribed to the notification process.

2. A method according to claim 1, wherein a notification content payload comprises elements identifying properties of the notification content payload, and wherein each subscriber process implements a respective notification graphical user interface (GUI), and wherein each subscriber process determines whether to update its respective notification GUI based on the elements in the notification content payload.

3. A method according to claim 2, wherein a subscriber process comprises a GUI user shell that interfaces with a windowing system of the operating system and which comprises user interface elements configured to interact with applications installed on the storage hardware of the computing device.

4. A method according to claim 2, wherein a subscriber process comprises a toast notification application that displays graphical toast notifications in response to receiving respective notification content payloads.

5. A method according to claim 1, wherein the publisher processes use the API to publish the notifications, wherein when a publisher process submits one notification through one invocation of the API, the one notification is published by the notification process to all of the subscriber processes.

6. A method according to claim 1, wherein the notification process reads all of the subscriber identifiers and according thereto builds respective event links with all of the respectively identified subscriber processes, and wherein the subscriber processes are all notified when the notification process receives a new notification by the notification process triggering inter-process events that are received and handled by the respective subscriber processes.

7. A method according to claim 6, wherein the first function comprises a publish-function that is configured to receive a notification parameter and in response publish a corresponding notification to the subscriber processes.

8. A method according to claim 7, wherein the second function comprises a subscribe-function that is configured to receive a subscriber identifier identifying a subscriber process and add the subscriber identifier to the set of subscriber identifiers.

9. A method according to claim 1, wherein the subscriber processes further include a toast manager that displays toasts for respective notifications received thereby.

10. A method according to claim 1, wherein a notification comprises two or more elements.

11. A method according to claim 1, wherein a notification comprises first and second rendering parameters, wherein a first subscriber receives the notification and renders the notification to the display according to the first rendering parameter, and wherein the second subscriber receives the notification and renders the notification according to the second rendering parameter.

12. A method according to claim 1, wherein a notification comprises an action, the method further comprising receiving, by a subscriber process, the notification, and displaying, by the subscriber process, a representation of the notification that includes an interactive indication of the action.

13. A method according to claim 12, further comprising invoking the action when the interactive indication is activated by a user input.

14. A computing device comprising:

processing hardware, storage hardware, and display;

the storage hardware storing an operating system configured to manage execution of processes by the processing hardware;

the storage hardware storing a notification pipeline configured to be executed by the processing hardware as a process managed by the operating system, the notification pipeline configured to receive requests submitted by other processes managed by the operating system, the requests corresponding to functions implemented by the notification pipeline, the functions including at least a publish function, the functions accessible to the other processes via an interface, the other processes including a listener process that receives notifications from the network;

the storage hardware storing a plurality of notification surfaces accessible to the other processes, each notification surface configured to be executed by the processing hardware to handle and interpret notifications conforming to a same notification format, each notification surface configured to control display of graphics in a respective notification display area;

the notification pipeline further configured to receive notification requests submitted by the other processes, including notification requests received via the network by the listener process, each notification request comprising a respective notification structured to conform to the notification format and comprising notification information configured to be displayed by one or more of the notification surfaces; and the notification pipeline further configured to, based on the received notification requests, pass each notification to each of the notification surfaces based on indicia of the notification surfaces being subscribed to the notification pipeline, wherein the notification surfaces include (i) a lockscreen that when active displays notifications received thereby and (ii) a graphical user shell comprised of application icons that displays the application icons with indicia of notifications received by the graphical user shell, wherein the lockscreen and the graphical user shell receive a same notification content payload based on being subscribed to the notification pipeline.

15. A computing device according to claim 14, wherein the notification pipeline is further configured to maintain a list of notification surfaces that have been subscribed to the notification pipeline and pass each notification request to the notification surfaces based on the list.

16. A computing device according to claim 14, wherein the notification pipeline is further configured to automatically signal one notification surface when another notification surface indicates that a notification has been dismissed.

17. A computing device according to claim 14, wherein at least one of the notification surfaces comprises a toaster.

18. A computing device according to claim 14, wherein each notification surface comprises respective different notification handling logic.

19. A computing device according to claim 18, wherein each notification comprises metadata, and wherein a first notification surface and a second notification surface are configured to receive a same notification and based on the metadata in the notification the first notification surface determines to display the notification information of the notification and the second notification surface determines to not display the notification information of the notification.

20. A computing device according to claim 14, wherein the storage hardware stores a listener process that is configured to be executed by the processing hardware and managed by the operating system, the listener process configured to listen for network communications comprising respective notifications received via a network, and pass the notifications in the network communications to the notification pipeline.

21. One or more computer storage hardware storing information configured to enable a computing device to perform a process, the process comprising:
    executing publisher processes on the computing device, the publisher processes publishing notifications to a notification handler, the notifications including local notifications generated on the computing device and network notifications received via a network, the publisher processes including a local publisher that generates the local notifications and a listener process that receives the network notifications via network;
    executing a plurality of notification surfaces comprising respective processes executing on the computing device, each notification surface comprising a notification display area designated to a different context of the computing device, the display areas comprising respective display formats, each notification surface configured to receive notifications that each conform to a same notification format and that each comprise a respective notice content, wherein some notifications comprise rendering parameters, the notifications including local notifications and network notifications;
    storing subscription information indicating that the notification surfaces are subscribed to a notification handler;
    executing the notification handler, the notification handler comprising another process executing on the computing device, the other process comprising a software interface available to be invoked by the publisher processes executing on the computing device and available to be invoked by the notification surfaces;
    receiving, by the notification handler, from the publisher processes executing on the computing device, the notifications, the notifications conforming to the notification format, and, for each notification received, according to the subscription information, sending the notification to the notification surfaces such that each notification surface receives the notification; and
    receiving, by the notification surfaces, the notifications sent by the notification handler, and, for at least some of the notifications, each of the notification surfaces displays the respective notification contents, wherein the notification contents of the some of the notifications, respectively, are displayed according to the rendering parameters such that a same notification displayed by one notification surface has a different appearance and content than when displayed by another notification surface.

22. One or more computer storage hardware according to claim 21, wherein the notification contents comprises text messages to be displayed by the notification surfaces.

23. One or more computer storage hardware according to claim 21, wherein the operating system comprises an application programming interface through which the notifications are submitted to the notification handler.

24. One or more computer storage hardware according to claim 21, wherein the notifications are received by the notification handler via inter-process communication and the notifications are sent by the notification handler using inter-process communication.

25. One or more computer storage hardware according to claim 21, wherein one notification surface comprises an icon configured to cause a corresponding application to launch on the computing device, and wherein one notification surface comprises a login screen or lock screen.

* * * * *